G. F. WENTZ.
SPONGING, SHRINKING, AND REFINISHING MACHINE.
APPLICATION FILED OCT. 14, 1910.

1,058,122.

Patented Apr. 8, 1913.

WITNESSES
Howard D. Orr.
F. T. Chapman.

INVENTOR,
George F. Wentz,
BY
E. G. Siggers
ATTORNEY

G. F. WENTZ.
SPONGING, SHRINKING, AND REFINISHING MACHINE.
APPLICATION FILED OCT. 14, 1910.

1,058,122.

Patented Apr. 8, 1913.
8 SHEETS—SHEET 6.

George F. Wentz, INVENTOR,

WITNESSES
Howard D. Orr.
F. J. Chapman.

BY
E. G. Siggers.
ATTORNEY

UNITED STATES PATENT OFFICE.

GEORGE FRANKLIN WENTZ, OF CLEVELAND, OHIO, ASSIGNOR TO SPOTLESS STEAM-SPONGER CO., OF CLEVELAND, OHIO, A FIRM.

SPONGING, SHRINKING, AND REFINISHING MACHINE.

1,058,122.   Specification of Letters Patent.   Patented Apr. 8, 1913.

Application filed October 14, 1910. Serial No. 587,065.

*To all whom it may concern:*

Be it known that I, GEORGE FRANKLIN WENTZ, a citizen of the United States, residing at Cleveland, in the county of Cuyahoga and State of Ohio, have invented a new and useful Sponging, Shrinking, and Refinishing Machine, of which the following is a specification.

This invention has reference to improvements in machines for sponging, shrinking, and refinishing cloth, and its object is to provide a machine for the purpose whereby the operations are greatly facilitated and the machine may be equally adapted for the several operations.

In accordance with the present invention there is provided a drying drum which, in practice, is heated by steam introduced thereinto, but as heretofore constructed such drums were defective and became leaky because of the inability of the structure to stand the steam pressure, or because of the inefficiency of the relief valve, the inability to withstand atmospheric pressure when the steam within the drum condensed to an extent to produce sub-atmospheric pressure.

In accordance with the present invention, the drum is constructed in a manner whereby the liability of leakage is practically eliminated and the relief valve is so constructed that on the establishment within the drum of sub-atmospheric pressure such relief valve is subjected to a degree of pressure which will start it to the open position even though it shall have become stuck to its seat in the closed position.

Since in the operation of the device the steam within the drum is being constantly condensed as it gives off its heat to the walls of the drum, there is a constant accumulation of water within the drum. This accumulation of water must be removed and by the methods heretofore employed the machine had either to be stopped and the water withdrawn from the drum, or there was a likelihood of the escape of steam and water in a manner to injure or endanger the workman. With the present invention the water of condensation is periodically ejected by the steam pressure within the drum when the drum is in a predetermined position, while during the rest of its rotative movement the escape of steam from the drum is automatically prevented.

For certain purposes it is desirable that the drum be rotated by hand, and for this purpose suitable hand holds are provided, and one of these hand holds is so constructed as to be utilizable as a pulley for causing the actuation of other parts of the mechanism.

For certain operations a wringer roll is necessary, and while under some circumstances a roll designed solely for the expressing of water from the goods being treated is the desirable form of wringer roll, under other circumstances this wringer roll is made in the form of a steam heated cylinder, and then provision is made for the blowing out of any water of condensation which may be formed within the cylinder by the pressure established therein because of the presence of steam used for heating the cylinder, such blowing out means being in part similar to those used in connection with the drying cylinder.

For shrinking goods water vats are provided, these vats being incorporated into one structure for ready handling in case of removal, and the invention contemplates means whereby water in one of these vats may be maintained hot, while water in the other vat is comparatively cool, the passing of the cloth to be shrunken first through hot water and then through cold water before being carried to the drying drum being found highly efficient for the purpose.

The several features of the invention as outlined, together with other features of the invention, will be best understood from a consideration of the following detailed description taken in connection with the accompanying drawings forming a part of this specification, with the understanding, however, that while the showing of the drawings is of a practical embodiment of the invention, the latter is susceptible of various modifications and includes such changes of structure or such arrangements, combinations or omissions of parts as will still include the distinctive features of the invention in whole or in part.

Referring to the drawings there is shown a frame composed of two end members 1, 2, which may be in the form of castings of skeleton type shaped to support the several members of the machine, and these end members are united by cross beams 3, 4, which may be formed of angle steel suitably bolted or otherwise united to the end members. The frame thus constituted is designed to support some portions of the structure, and erected on this frame as upward continuations of the end members 1 and 2 are other frames 5, 6, respectively, of open web construction and shaped to support other portions of the machine. The upper ends of the frames 5 and 6 are progressively narrowed and ultimately formed into journal bearings 7, 8, respectively, each bearing being provided with a cap member 9. These journal bearings 7, 8 are designed to receive the journals of a cylinder or drum 10 constituting the drying drum of the machine and designed to receive steam at such pressure as may be necessary to impart to the drum the desired heat.

Figures 4, 14, 15:
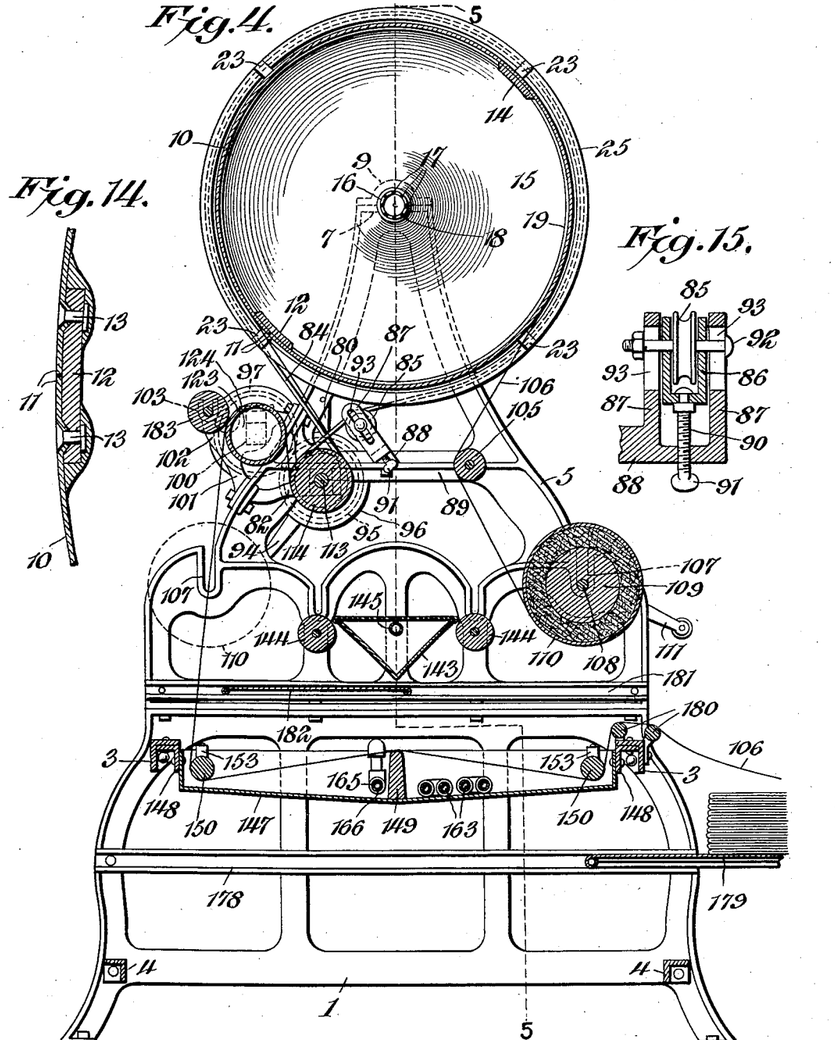
Fig. 4 is a central vertical section from front to rear of the machine.
Fig. 14 is a cross section on an enlarged scale of the meeting edges of the drying drum shell and of the junction strip therefor.
Fig. 15 is a cross section of the belt tightener structure used in conjunction with the driving means for the drying drum.

The main body of the drum 10 is made of sheet metal rolled into cylindrical form with the edges abutting as indicated at 11. Inside the drum and covering the abutting edges is a longitudinally disposed strip 12 of a width to permit a double row of rivets 13 on each side of the joint, and of a thickness permitting the rivet holes to be countersunk into the strip so that the shell of the drum immediately surrounding the rivet may be made set down into the countersink by a suitable tool. By this construction a good head may be formed on the outer end of each rivet with its upper face flush with the face of the shell, thereby leaving the shell perfectly smooth on its exterior, while the shell is securely united to the strip. The heads initially formed on the rivets are interior to the strip 12, and these heads as well as the edges of the strip where engaging the inner face of the shell are covered with solder, thus effectually sealing the joint against leaks. A counter-balance 14 is secured to the diametrically opposite side of the drum interior thereto, so that the equilibrium of the drum is maintained.

The ends of the cylinder 10 are closed by heads 15 bowing outwardly from center and circumference, and these heads are carried by a shaft 16 which in the structure shown in the drawings is tubular, and between the heads is formed with numerous perforations 17, whereby steam admitted to the shaft may find escape into the interior of the drum.

At the center each head is formed with an inturned annular flange 18 and at the periphery with a like flange 19, these flanges being concentric one to the other and with the axis of rotation of the drum, the flange 18 embracing the shaft 16 and the flange 19 being inset into the corresponding end of the drum 10.

Where the head is formed with the flange 18, it is provided with a hub or collar 20 which may be secured to the shaft by a suitable number of set screws 21, it being customary to use three of these screws for each collar and equi-distantly disposed therearound, so that the collar may be centralized with reference to the axis of rotation, and at the same time secure the drum to the shaft. After the collar has been properly adjusted on the shaft, the portion of the head 15 abutting against this collar, which is properly shaped for the purpose, is sweated to the collar with solder, thus securely sealing the drum and collar against leaks. The same means of uniting the head to the drum where the flange 19 projects into the drum is employed, the parts being sweated together with solder, and afterward the end of the drum which when the head is properly positioned projects somewhat, is turned down over the edge of the head as indicated at 22 and is sealed against possible leaks by solder. By this means the body of the drum and the heads are firmly united and sealed against possible leaks of steam under pressure therethrough, and while the soldering is not depended upon for resisting the internal pressure, it aids materially in strengthening the drum, the main purpose of the solder being to seal the joints against leaks.

Figure 3:
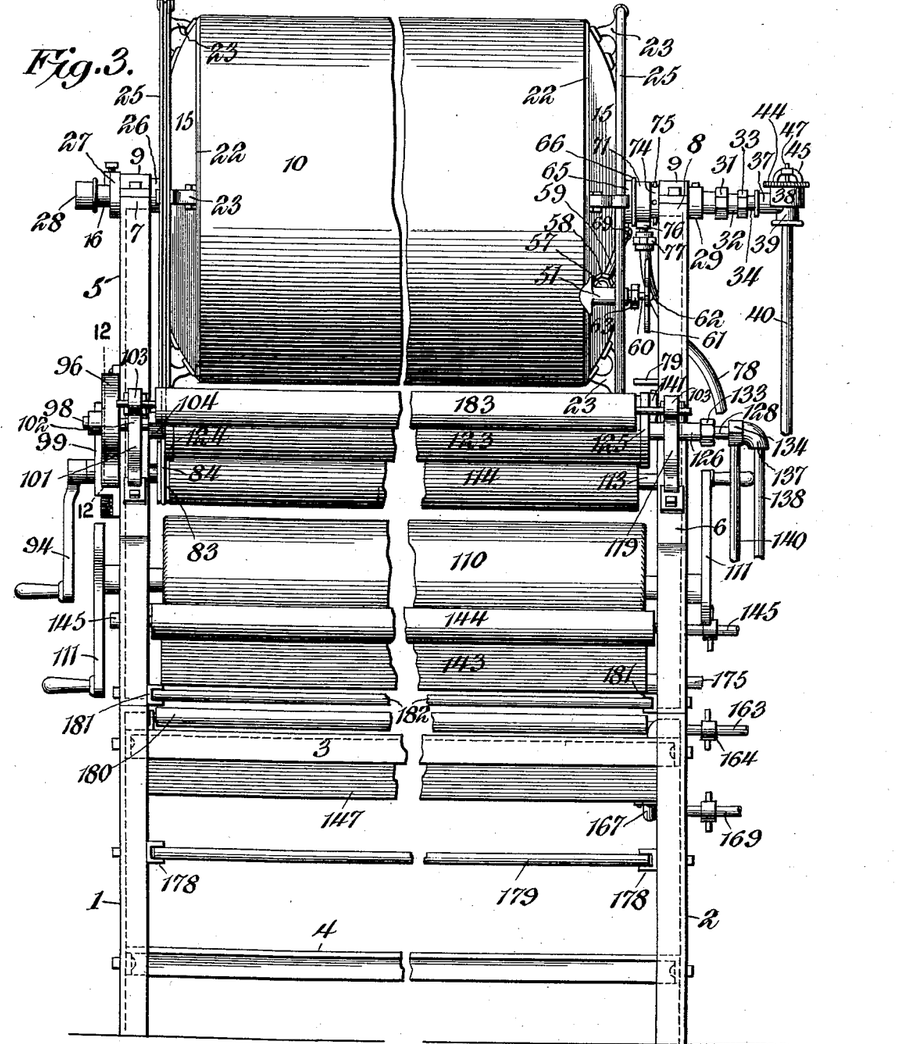
Fig. 3 is an elevation of one side of the machine, the structure being broken in two for convenience of illustration.
Figure 5:
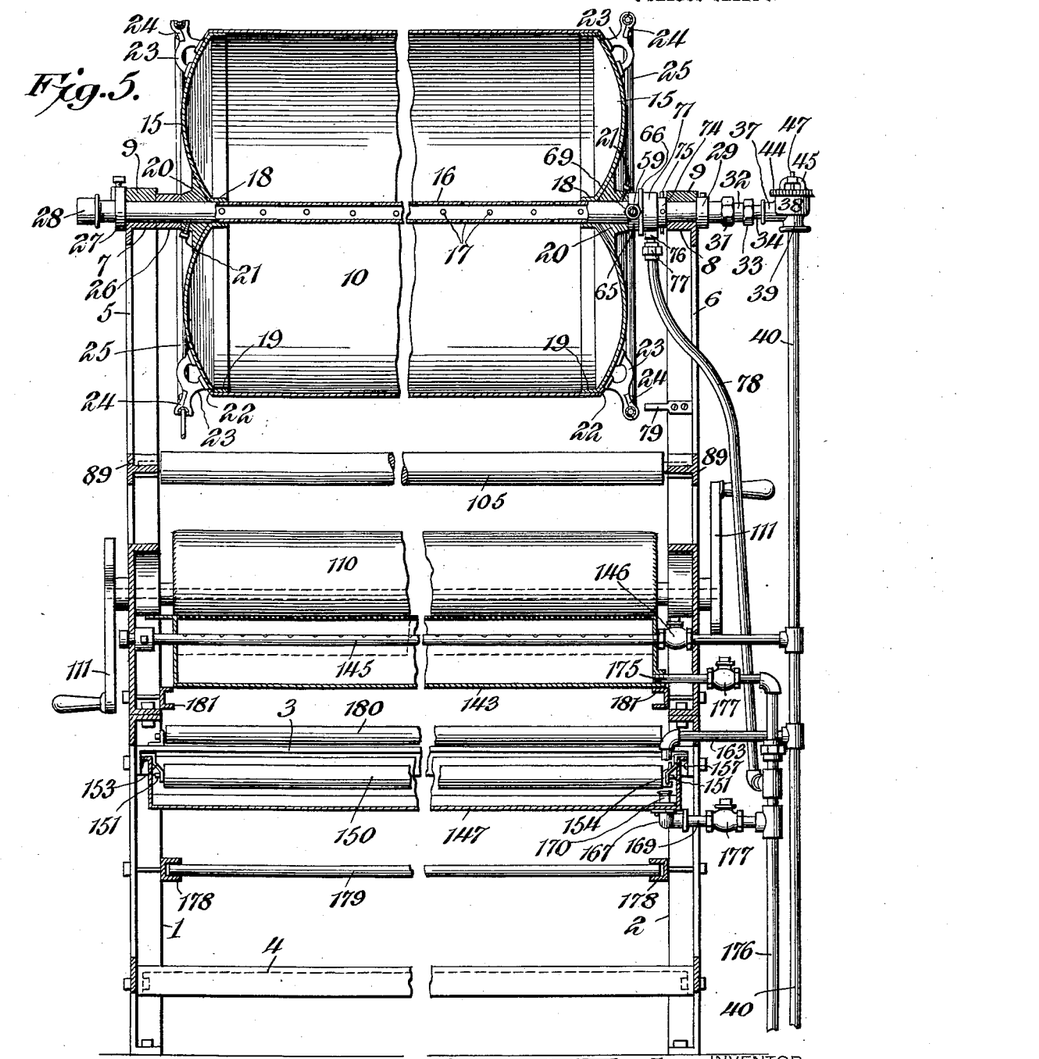
Fig. 5 is a section on the line 5—5 of Fig. 4.
Figure 6:
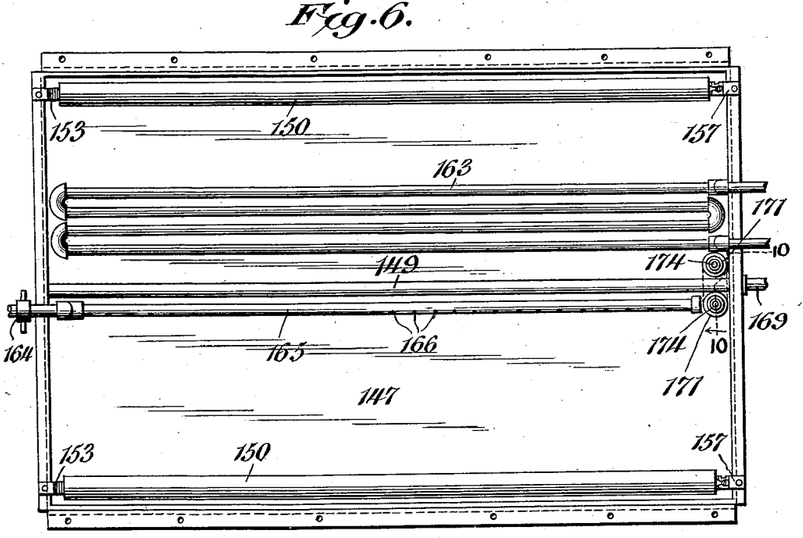
Fig. 6 is a plan view of the hot and cold water vat.

Fast to each head 15 at appropriate points are brackets 23 located near the peripheries of the heads and united thereto in any appropriate manner. These brackets are equidistantly disposed about each head and have at their outer ends clamp members 24 which coact with the body portion of the outer end of the clamp member to grip a hand rail 25, this hand rail being usually made of a suitable length of pipe bent into circular form and made fast to the corresponding head 15 by the brackets 23 carried thereon. The handrail forms a convenient means for rotating the drum and will remain sufficiently cool for ordinary handling even when the drum itself is too hot to be touched. One of the pipes or hand rails 25, say that one at the end of the drum adjacent to the frame member 5, is cut away on its outer edge to expose the interior thereof, and the brackets are correspondingly cut away, as shown in Figs. 3 and 5, to serve not only as a handrail but as a pulley for a purpose which will hereinafter appear. The shaft 16 is continued through the bearing 7 with an interposed collar 26 between the collar 20 at that end of the drum and the bearing 7. Outside the bearing the shaft has applied thereto a set collar 27, and beyond this collar the end of the shaft is closed by a cap 28, since the shaft is made of pipe throughout.

The shaft is carried through the bearing 8 and beyond this bearing is made fast thereto a set collar 29, the two collars 27 and 29 preventing endwise movement of the shaft irrespective of the collar 20 and parts interposed between the same and the bearings 7 and 8. The shaft 16 is continued a short distance beyond the collar 29 and has its end screw threaded, as shown at 30, to receive a nut 31 provided with a hollow neck 32 threaded at the outer end to receive a gland 33 coupling a tube 34 to the neck 32, the tube being of a diameter to enter the neck and having an exterior flange 35 engaged by the gland 33 and confining packing 36 between the outer end of the neck 32 and the flange 35. This structure constitutes a swiveled union permitting the shaft 16 to turn with relation to the tube 34 about the longitudinal axis of the shaft and tube, these two members being in alinement, while the gasket 33 and packing 36 prevent leakage at this point. The end of the tube 34 remote from that introduced into the neck 32 is screwed into a neck 37 in one side of a valve casing 38, which latter is provided with another neck 39 at right angles to the neck 37, and this neck 39 is threaded to receive the threaded end of a pipe 40 coming from a suitable source of steam supply, which, however, is not shown in the drawings.

In line with the neck 39 the casing 38 is formed with a chamber 41, and beyond this chamber 41, and in communication therewith, is another chamber 42 having the end remote from the chamber 41 open to the atmosphere through a passage 43, and the corresponding end of the casing 38 is threaded to receive a cap 44 provided with a guide bracket 45 about the opening 43 and confining a packing ring 46 to the corresponding end of the casing. The bracket 45 is formed with a passage for a valve stem 47 carrying two spaced valve members 48, 49, respectively, the valve 48 being larger than the valve 49. The valve 48 is designed to engage the packing ring 46 when this valve is moved thereagainst, and the valve 49 is designed to seat in the end of the chamber 41 adjacent the neck 39, but under these circumstances the valve 48 is then most distant from the packing 46, and when the valve 48 is against the packing 46, then the valve 49 is removed from its seat and is near the other end of the chamber 41. Extending through one wall of the chamber 41 is a passage 50 placing this chamber in communication with the neck 37, so that when the valve 49 is moved to the end of the chamber 41 adjacent to the chamber 42 the steam pipe 40 communicates with the interior of the shaft 16 by way of the passage 50, the neck 37, the tube 34, and the neck 32. The chamber 42 is, also, in communication with the neck 37, and when steam enters the latter it also passes into the chamber 42 holding the valve 48 against the packing 46 because the pressure within the chamber 42 is in excess of atmospheric pressure. When steam is cut off from the pipe 40 by any suitable valve, such as is usually employed for the purpose, the pressure within the shaft 16 and parts connected therewith is reduced by the condensation of the steam until ultimately this pressure reaches or passes below atmospheric pressure, and the latter exerted upon the valve 48 through the passage 43 will move the valves 48 and 49 toward the seating position of the valve 49, thus causing a movement of the valve 48 away from the packing 46, and air at atmospheric pressure is admitted to the chamber 42 and from thence to the shaft 16 and ultimately to the interior of the drum 10. The valve members 48, 49 with the casing 38 constitute a relief valve structure, closing automatically on the passage of steam to the interior of the drum 10 and opening automatically on the reduction of pressure within the drum to sub-atmospheric pressure, so that the difference of pressure inside and outside the drum where the external pressure is the greater can never reach more than a negligible difference, since a reduction of pressure within the drum but slightly below atmospheric pressure will cause the opening of the valve and the admission of air under normal pressure to the interior of the drum in sufficient quantities to counter-act the tendency of condensation of steam within the drum to establish such sub-atmospheric pressure as would cause a collapse of the walls of the drum. The use of an ordinary check valve for admitting air to the drum when the pressure therein is reduced below atmospheric pressure has been found in practice to be unreliable, since such valves sometimes become stuck when in the closed position, with the result that the sub-atmospheric pressure produced within the drum becomes sufficient to cause the collapse of the drum, or these valves are sometimes held open by foreign substances, especially those of a gritty nature, and steam is allowed to escape. With the structure of the present invention such faults are not present, since the large surface of the valve presented to atmospheric pressure while the valve is in the closed position causes the forcing open of the valve as soon as the pressure within the drum reduces even slightly below atmospheric pressure, and usually the valve will open before this occurs because of the weight of the valve. Furthermore, the washer 46 may be made of lead or like material, so that grit will sink therein and thus not interfere with the proper closing of the valve.

There is always, of course, a constant accumulation of water of condensation within the drum so long as the latter is in operation. It has been customary to remove this water of condensation by means of a hand operated stop cock or faucet bib, and the water is caught in a trough while being blown out during the time that the faucet is describing the lower part of its revolution. Such mode of removing the water of condensation is a nuisance as well as presenting an element of danger to the operator, because of the hot water and steam being blown out, especially during the upper portion of the revolution of the faucet, due to the impracticability of closing the faucet after it has passed the trough. There was also an unnecessary waste of steam.

In accordance with the present invention one of the heads 15, preferably that adjacent to the frame member 6, is provided with a valve casing 51 secured to the head in any suitable manner, and this casing is provided with a longitudinal bore 52 opening to the interior of the drum 10 through the head carrying the valve casing by a passage 53 close to the periphery of the head. The bore 52 of the casing 51 is enlarged to form a seat for a cylindrical valve 54 which may be bored out longitudinally in line with the passage 52, and has oppositely disposed ports 55 in line with a passage 56 formed in a neck 57 on one side of the valve casing 51, this neck having terminal screw threads for the reception of a coupling 58 connecting one end of a pipe 59 to the neck 57. The outer end of the valve 54 has a reduced stem 60 having a terminal square portion to which is secured a four-arm star wheel 61, by means of a screw 62 or otherwise. That end of the valve casing beyond which the valve stem extends is externally threaded for the reception of a gland 63 confining suitable packing about the corresponding end of the valve and serving to maintain the valve in its seat.

Fast on the shaft 16 between the bearing 8 and the collar 20 adjacent thereto is a sleeve 64 having one end enlarged and formed with an annular channel 65 open toward the other end and exterior to this channel formed with an overhang flange 66 designed to receive and retain packing 67. On one side of the sleeve where provided with the channel 65 there is formed a neck 68 threaded at the outer end and having a passage therethrough communicating with the channel 65. This neck receives a coupling 69 connecting the corresponding end of the pipe 59 to the neck 68. The collar 64 is extended beyond the channel end and is formed at a point adjacent thereto with a bearing for an inwardly directed flange 70 on a sleeve 71, this flange having a broadened terminal portion 72 bearing on the corresponding portion of the sleeve 64. One end of the sleeve 71 is shaped to enter the overhang flange 66 and engage the packing 67 therein, while the other end of the sleeve overhangs the flange 70 to form a pocket for packing 73 held therein by the corresponding end of a nut 74 applied to that end of the sleeve 64 adjacent to the bearing 8 where the sleeve is screw threaded for the purpose. The nut 74 is provided with radial pins 75 whereby it may be so adjusted as to compress the packing 67 and 73 into steam tight relation to the parts engaged thereby. The sleeve 71 is formed on one side with a neck 76 having a passage therethrough communicating with the interior of the sleeve between the flange 70 and the channel 65, these parts defining an annular chamber about the sleeve 64. The neck 76 has applied thereto a coupling 77 connecting a pipe 78 thereto, this pipe being designed to convey water of condensation to a suitable point of disposal.

The passages 55 through the valve 54 are diametrically opposite each other, while the remainder of the walls of the valve are unbroken. The relation of these passages to the walls of the valve is such that at the quarter turns of the valve the passages 52 are alternately put in communication with the passage 56 and closed thereto.

Fast to the frame member 6 at appropriate points are fingers 79 in the path of the arms of the star wheel 61, and the arrangement is such that as the drum is rotated and the star wheel approaches the lowermost position, one of the fingers 79 in its path engages the star wheel and causes it to move a quarter turn. Assuming that previous to this the valve 54 is closed, and this is the condition in practice, the finger 79 will move the valve to the open position, so that the interior of the drum is put in communication through the valve 54 with the pipe 59. During the movement of the drum whereby the valve casing 51 is caused to travel through the lowermost portion of its path, the valve 54 passes the drum in communication with the pipe 59 and the steam pressure within the drum is exerted on water of condensation within the drum to force the same into and through the pipe 59 to the channel 65, thence into the sleeve 71 and out through the neck 76 into the pipe 78, the sleeve 71 being held against rotation by the pipe 78 or other suitable means, while the sleeve 64 is rotating with the shaft 16. Ultimately the star wheel reaches the second pin 79 and is given a quarter turn, thereby shutting off the interior of the drum from the pipe 59 and during the remainder of the rotative movement of the drum, and until the star wheel again reaches the first named finger 79, the drum remains closed to the pipe 59. By this means the drum 10 may be cleared of accumulations of water of condensation at each turn, the operation being entirely automatic. By providing the star wheel 61 with appropriate indications, as for instance the words " On " and " Off," this star wheel may be manipulated by hand, such manipulation being at times desirable and the operator may always know the position of the valve. Fast to the frame member 5 at a point below the drum 10 is a bracket 80 shown in the particular structure illustrated as a three-armed bracket with the legs made fast to the frame, and at the angle formed with a bearing for a short shaft 81 having another bearing in a bracket 82 made fast to the frame member 5. Inside the plane of the frame 5 the shaft 81 carries a pulley 83 from which extends a belt 84 to the hand rail 25 which is cut away to constitute a pulley for the drum. Since in the operation of the machine it is desirable that the pulley 83 and the drum 10 should revolve in opposite directions, the belt 84 is crossed and since this belt is liable to stretch, a suitable belt tightener is provided, which belt tightener is shown as an idler pulley 85 carried by a yoke frame 86 traveling between two elongated ears 87 formed on a bracket 88 made fast to a cross member 89 of the frame member 5. The yoke 86 is connected to a screw rod 90 extending through a threaded portion of the bracket 88 and provided with a wing end 91, whereby the yoke may be adjusted as desired, the screw rod 90 swiveling in the said yoke. The journal support for the roller 85 is in the form of a bolt 92 extending through the side members of the legs of the yoke 86 and through elongated slots 93 in the wings of the bracket 88. When the desired degree of adjustment of the roller has been accomplished, the tightening of the bolt will hold it in position irrespective of the screw rod 90, and when it is desirable to adjust the roller the bolt is loosened and the rod 90 is manipulated to the desired extent, after which the bolt may be again tightened.

Outside the bracket 80 the shaft 81 has secured thereto a crank 94 by means of which the shaft may be readily rotated, but since it is not mandatory that this shaft be rotated by hand, the crank 94 may be taken as indicative of any suitable means whereby power for rotating the shaft may be applied.

The shaft 81 intermediate of the journal bracket supporting it, has fast thereto a gear wheel 95 housed in a casing 96 made fast to the frame member 5 by bolts or otherwise, and this gear wheel is in mesh with another gear wheel 97 also confined within the casing 96 which is shaped to conform to the gear wheels protecting them against injury or dirt, and also protecting operators from danger. The gear wheel 97 is fast on a shaft 98, which is, also, a short shaft like the shaft 81. The shaft 98 is journaled at its outer end in a bracket 99 fast to an appriate part of the frame member 5, and near the other end passes through a bearing block 100 carried by a bracket 101 fast on the frame member 5. The bracket 101 has an off set arm 102 terminating in a bearing yoke 103 for a purpose to hereinafter appear. The inner end of the shaft 98 is formed into a head 104 in the end of which is formed an axial socket of angular form, preferably, though not necessarily, squared in cross section. The purpose of this socket will appear hereinafter.

Figure 1:
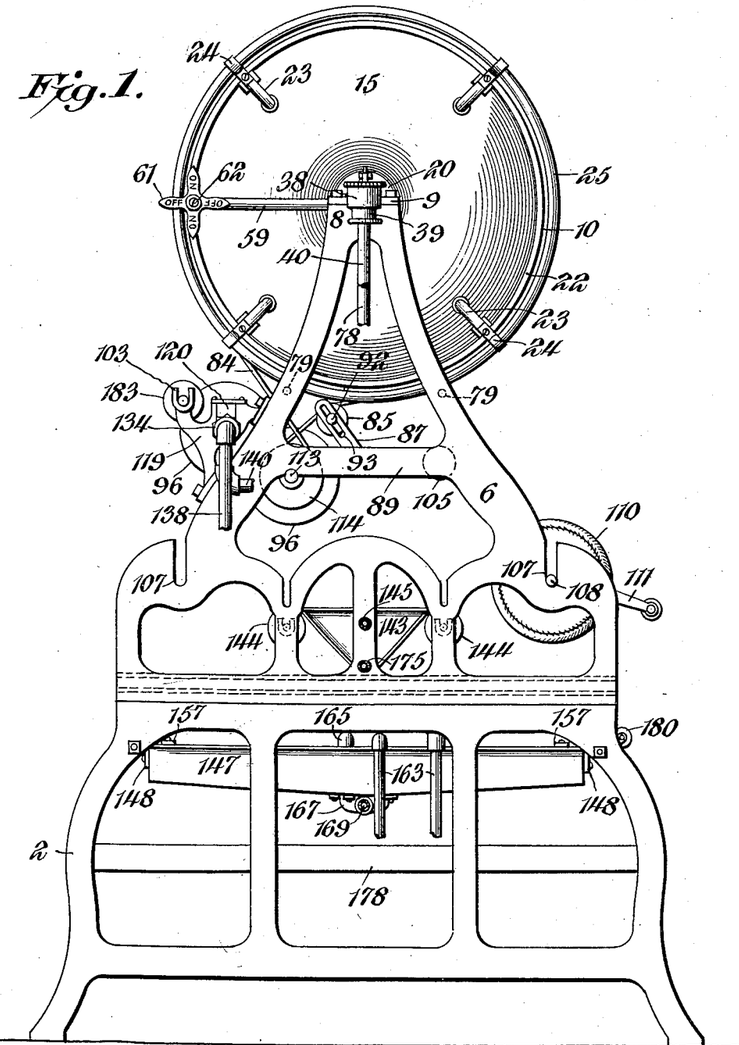
—Figure 1 is an end elevation of the machine as adapted for shrinking and finishing of cloth.
Figures 2, 13:
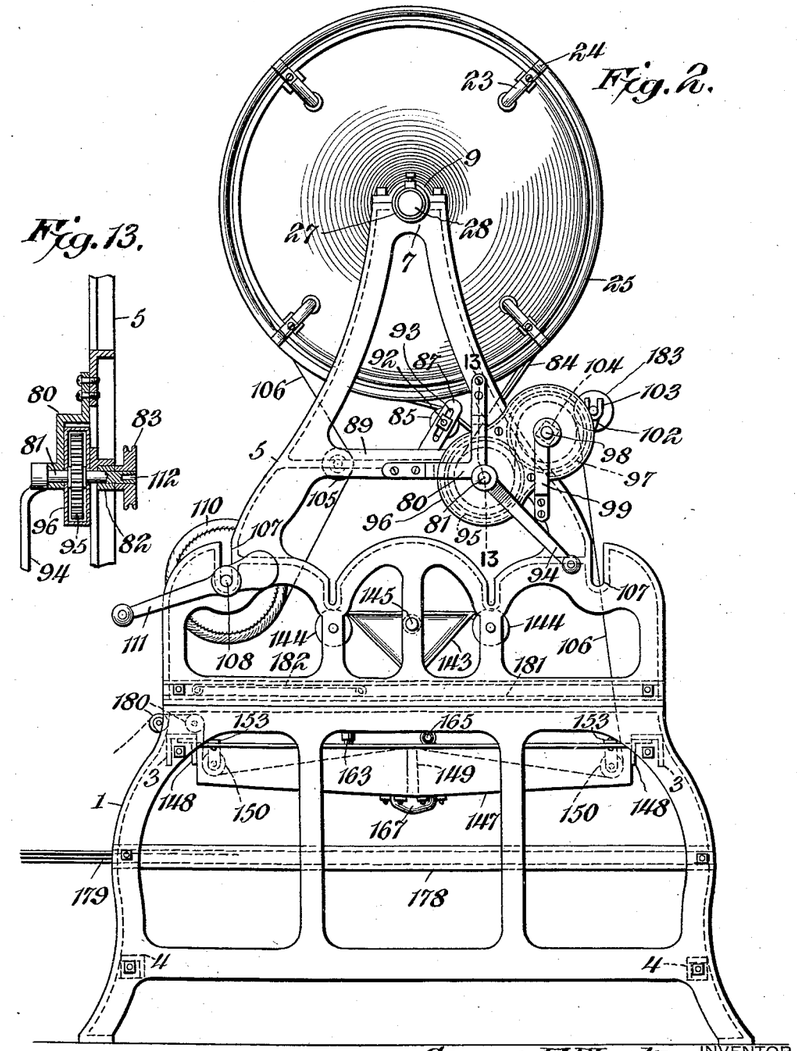
Fig. 2 is a similar view of the end of the machine remote from that shown in Fig. 1.
Fig. 13 is a section on the line 13—13 of Fig. 2.

Journaled in the frame members 5 and 6 near one side thereof is a roller 105, this roller being designed for the purpose of holding a web 106 of cloth, shown in Figs. 2 and 4, in contact with the outer surface of the drum 10. The members 5 and 6 of the frame are formed near opposite sides with recesses 107 to receive the ends of a rod 108 on which is made fast a roller 109, which in turn may be provided with a circumferential pad 110 forming a receiving surface for the web of cloth upon which the latter may be wound. Either or both ends of the rod or shaft 108 has fast thereto a crank handle 111, whereby an operator may turn the roller to wind the cloth thereon after the same has passed about the drum 10. The recessed bearings 107 for the journals of the cloth receiving roller permit the ready removal or insertion of this roller in the frame of the machine on either side of the drum.

The end of the shaft 81 carrying the pulley 83 is provided with an axial bore or socket 112 designed to receive one end of a shaft 113 carrying a roller 114 serving as a cloth guide roller, like the roller 105. Since for certain purposes it is desirable to remove the roller 114, a journal bracket 115 is provided for the other end of the shaft 113 remote from the shaft 81, and this bracket is made fast to the frame member 6. A journal bearing 116 is formed in this bracket and leading from one side of this journal bearing is a passage 117 of sufficient size to admit the corresponding end of the shaft 113, and this passage is carried for a distance lengthwise of the bracket and terminates at a mouth 118 whereby the shaft 113 may be inserted through the mouth 118 and then caused to traverse the passage 117 until it is finally lodged in the journal bearing 116, the relation of the parts being such that the pull of the cloth web 106 on the roller 114 is such as to maintain the end of the shaft 113 in the seat 116 unless purposely removed therefrom, while such removal may be accomplished with the greatest facility.

Figure 7:
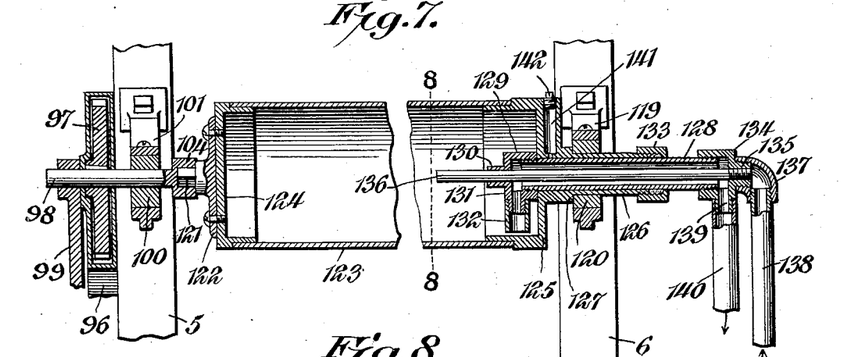
Fig. 7 is an axial section of a steam heated wringer drum and associated parts.
Figure 8:
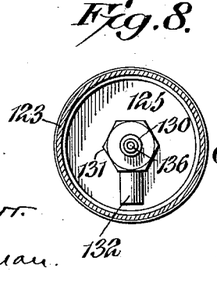
Fig. 8 is a section on the line 8—8 of Fig. 7.
Figures 9, 10:
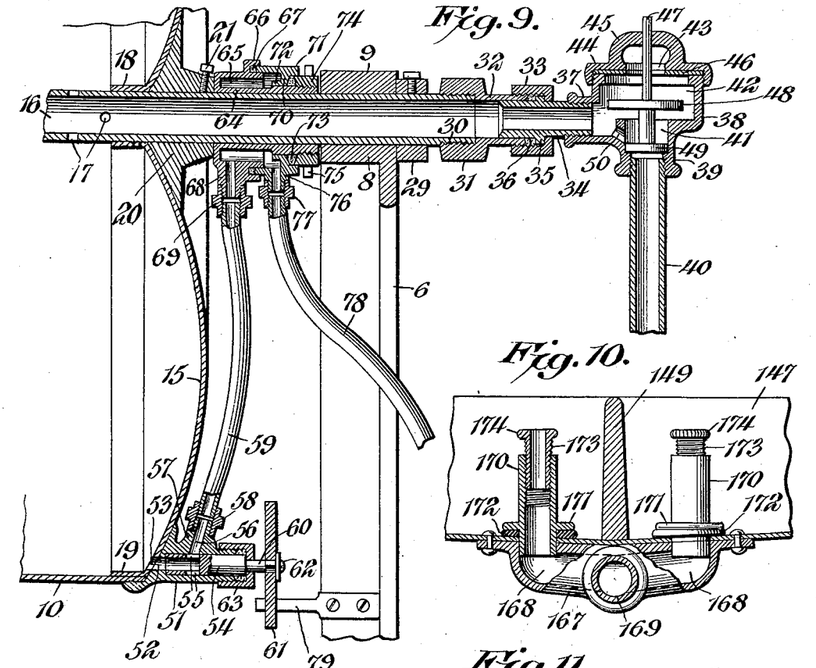
Fig. 9 is an axial section of a portion of one end of the drying drum and parts associated therewith for the introduction of steam or air and the escape of the water of condensation, the showing being on a larger scale than that of the preceding figures.
Fig. 10 is a section on the line 10—10 of Fig. 6.

In line with the bracket 101 and mounted on the frame member 6 is a like bracket 119 having a bearing block 120. Adapted to the socket of the head 104 is a square pin 121 on an end plate 122, which may constitute the end plate of an ordinary rubber covered wringer roll, the other end of which will then be journaled in the bearing block 120 of the bracket 119, but such wringer roll may be replaced by a steam heated roll, such as best shown in Fig. 7. This roll is formed of a cylinder or drum 123 having heads 124, 125 at the opposite ends, the head 124 carrying the pin 121 adapted to the socket head 104, while the head 125 is provided with an axial tubular extension 126 traversing the bearing block 120 and constituting the journal for the receiving end of the drum 123. This extension 126 may be in one piece with the head 125, and the latter may have a shoulder 127 thereon close to the head constituting an abutment engaging the bearing block 120 to thereby hold the pin 121 in the socketed head 104. Extending through the tube or elongated hub 126 is a tube 128 threaded at both ends, and at the inner end inside the head 125 carrying a cap 129 with an axial neck 130 provided with an axial bore. The cap 129 is also provided with a radial neck 131 to which may be screwed a short pipe section 132 of a length bringing its open end close to the inner wall of the head 125, which head is extended lengthwise of the drum 123. The tube 128 extends through a gland 133 applied to the outer end of the elongated hub 126 which is threaded for the purpose, and this gland may confine packing to make the connection at this point steam tight, the hub extension 126 and gland 133 rotating on the tube 128 which remains stationary with the extension 132 within the drum 123 directed downwardly.

Applied to the outer end of the tube 128 is a cap member 134 having a short axial neck 135 designed to receive the corresponding end of a pipe 136 leading lengthwise through the tube 128 centrally thereto and through the bore of the neck 130 into the interior of the drum 133, and since these parts are all in immovable relation one to the other, the pipe 136 where traversing the necks 130 and 135 may be in steam tight relation thereto. Applied to the neck 135 which is exteriorly threaded, is an elbow 137 receiving one end of a pipe 138, and the cap 134 has a tubular neck 139 in radial relation thereto and leading to the interior of the cap, said neck receiving the corresponding end of a pipe 140. The pipe 138 is assumed to be connected to a source of steam supply, and, of course, will have included in it a suitable controlling valve, and the pipe 140 is assumed to lead to a suitable point of disposal of water of condensation. Steam is allowed to enter the drum 123 by way of the pipe 138, elbow 137, and pipe 136, while the water of condensation accumulating at the lowermost portion of the drum 133 is forced by the steam pressure through the pipe 132 which is brought into close relation to the bottom of the drum, and thence by way of the neck 131 to the tube 128 to the outer end thereof to be there directed through the neck 139 into the pipe 140 and so to the point of disposal. The drum 123 will rotate because of its connection to the shaft 98 by way of the angular pin 121, and this rotation is permitted by the swivel connection due to the tube 128 and the hub 126. In order to properly lubricate this connection, the head 125 may have formed thereon a lubricant cup 141 opening through the hub 126 to the tube 128, and at the outer end normally closed by a plug 142.

The machine of the present invention is designed for either hot and cold water shrinking, or for steam shrinking. For the latter purpose there is mounted in the structure between the frame members 5 and 6 a steam compartment 143 with guide rollers 144 on either side thereof, the top of the compartment 143 being flat and the sides converging toward the bottom. A perforated steam pipe 145 enters this compartment through one end and at opposite ends is supported in appropriate parts of the frame members 5 and 6, the perforated portion of the pipe 145 being within the compartment 143. The pipe 145 is shown as connected to the steam pipe 40, and between the same and the corresponding end of the compartment 143 this pipe is provided with a valve 146.

Figure 11:
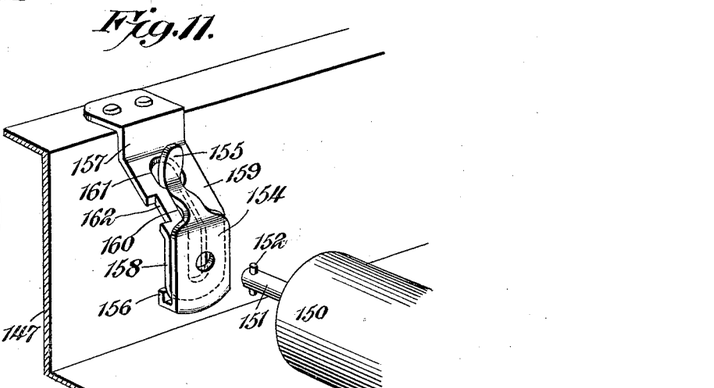
Fig. 11 is a perspective view of a portion of the water vat and of a supporting bracket for an idler guide roll in the water vat.
Figure 12:
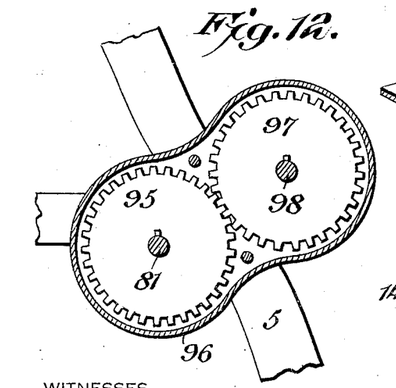
Fig. 12 is a section on the line 12—12 of Fig. 3.

For the shrinking of goods by first subjecting them to hot and cold water, there is provided a vat 147 lodged between the frame members 1 and 2 and supported by the connecting beams 3 through the intermediary of angle irons 148 made fast to the corresponding walls of the vat and bolted or riveted to the cross beams 3. The vat increases in depth toward the middle portion, where it is provided with a division wall 149 reaching to the top of the vat and having its upper edge rounded, since the cloth to be treated is drawn over this upper edge of the division wall 149. The bottom of the vat on each side of the division wall slopes upwardly toward the corresponding ends of the vat, the division wall separating the vat into two like compartments deeper at the division wall than at the parts more remote from the division wall. At each end of the vat there is mounted a cloth directing roller 150. Each roller 150 is formed with end pintles 151, such as shown in Fig. 11, except that one of the end pintles is provided with a cross pin 152 at its outer end projecting a short distance beyond the pintle at diametrically opposite points thereof. Fast to the corresponding side wall of the vat are brackets 153 designed to receive the pintles not traversed by the pin 152. Those pintles 151 traversed by the pin 152 each carry a latch plate 154 through which the pintle passes, this latch plate being secured to the pintle against accidental removal by the pin 152, but for clearness of illustration the plate 154 and pintle 151 in Fig. 11 are shown separated. At one end the plate 151 is bent into a manipulating handle 155, and at the other end is formed with a return lip 156 in spaced relation to the corresponding face of the plate. Fast to the corresponding end wall of the vat 147 are brackets 157 for the pintle 151 traversed by the pin 152. These brackets have a terminal member 158 connected by an angle portion 159 to that part of the bracket made fast to the vat. Extending along the angle portion 159 and the terminal part 158 is an elongated slot 160 enlarged within the angle member 159, as shown at 161, and produced in that edge of the angle member 159 is a recess 162. The lower end of the terminal member 158 is rounded as indicated in Fig. 11.

To place the rollers 150 in the vat, the plain pintle is introduced into the bearing made therefor in the bracket 153 while the other pintle is moved downward to the bracket 157, so that the pin 152 will pass through the slot 160 as the lip 156 traverses the recess 162, the latch plate 154 being at this time in proper position to permit such movement. As soon as the pintle 151 reaches the bottom of the slot 160, the latch plate may be turned on the pintle as an axis until the handle end 155 reaches the enlargement 161 of the slot 160, when a slight elasticity of the several parts will cause the seating of the handle end 155 in the enlargement 161, thus locking the plate 154 against movement under the normal operation of the device. When it is desired to remove either roller 150, the latch plate 155 is moved from its normal position into a position substantially at right angles to the position shown in Fig. 11, and then the corresponding end of the shoulder may be elevated, the lip 156 escaping through the recess 162, after which the pintle at the other end of the holder may be easily withdrawn from the corresponding bracket 153.

Water within one chamber of the vat is maintained heated by steam pipes 163 in the form of a coil led along the deeper portion of the corresponding chamber of the vat and carried over one side wall of the same, and these pipes may be connected to the steam supply by lever unions 164 permitting the ready removal of the pipe without the necessary aid of tools when it is desired to clean the vat. A cold water pipe 165 is provided for the other compartment of the vat and this cold water pipe may have perforations 166 for the ready introduction of cold water therein as needed.

In the operation of the device, the rollers 150 constitute submerging rollers for the cloth to be treated, this cloth passing down around under one of these rollers, thence over the division wall 149 and under and around the other roller, and thence upward out of the vat, the course of the cloth through the vat being through the hot water side thereof first, and then through the cold water side. It is desirable that the amount of water in the vat should be maintained substantially constant, although it may be desirable under some circumstances to have a greater depth of water than under others, and it is also desirable to be able to drain the vats at any time. For this purpose there is provided a casting 167 having divergent passages 168 therein leading to a common outlet 169. This casting is made fast to the under side of the bottom of the vat with the passages 168 opening into respective compartments of the tank through suitable holes in the bottom of the tank. Stoppers are adapted to these passages, each stopper comprising a tubular member 170 with an annular flange 171 near one end thereof, this flange forming an abutment for an elastic washer 172 so that when the shorter end of the tube 170 is inserted through the corresponding perforation in the bottom of the vat and into a passage 168, the washer 172 will engage the bottom of the vat and form a water tight connection therewith after the manner of an ordinary basin stopper. The other end of the tubular member 170 is of sufficient length to extend a material portion of the distance toward the top of the vat, and this end is internally screw-threaded for the reception of a nipple 173 having a manipulating flange 174 at one end, which flange may be milled to facilitate the actuation thereof. The nipple 173 is provided with a passage completely through it and may be screwed into and out of the tube 170 to shorten or elongate the latter. The tubular member with the adjusting nipple 173 forms a depth gage and overflow, so that the introduction of water into the vat compartments will cause no greater depth of water therein than is determined by the overflow stopper, while the entire amount of water in either or both compartments of the vat may be allowed to escape through the casting 167 to the common escape pipe 169 by the withdrawal of either stopper tube and depth gage 170.

The waste pipe 78, the pipe 169 and the escape pipe 175 for the steam chamber 143 may all be connected to a common waste pipe 176 leading to any suitable point of disposal and to prevent any possible return of waste water to the pipes 169 and 175, each may be provided with a check valve 177 opening toward the waste pipe 176.

On opposite sides of the frame members 1 and 2 in facing relation one to the other, are channel guide bars 178 designed to receive and support a shelf 179 in such manner that this shelf may be moved into and contained within the confines of the frame, or drawn out therefrom to a sufficient extent to support a pile of goods in flat folds, as indicated at the right hand side of Fig. 4. Idler guide rolls 180 are mounted on an appropriate one of the beams 3, so that cloth coming from the pile on the shelf 179 may be directed therefrom by the rollers 180 to the submerging roll 150 in the hot water compartment of the vat.

Fast to the members of the frame above the vat are other channel guides 181 adapted to receive a plate 182.

The bearings 103 of the brackets 102 are designed to receive the journals of an idler wringer roll 183 in operative relation to the drum 123.

In the operation of the machine, the cloth or fabric to be shrunken is placed upon the extended shelf 179 in flat folds and the end of the pile of cloth is passed over the idler rollers 180, thence into the hot water side of the vat 147 around and under the roller 150 at the entrance end of this vat, thence over the partition or bridge piece 149, then through the cold water side of the vat, thence under and around the roller 150 at the end of this vat, thence over and around the wringer drum 123 between the same and the roller 183, thence under and around the roller 114, thence upward and over and around the drum 10, thence downward back of the guide roller 105, and finally to the drum 109, which last named drum may be representative of any suitable drum upon which the goods may be wound. In its travel over the course named, the cloth is first passed through a bath of hot water, made hot by steam traversing the coil 163, thence through cold water in the other side of the vat, this water being maintained at a suitable temperature by the cold water entering the same through the pipe 165 and flowing out through the appropriate overflow plug 170, thence the cloth is subjected to the wringer drum 123 or to an ordinary wringer roll replacing the drum 123 in accordance with the character of the cloth being treated, and thence over the drying drum which imparts to the goods a highly finished and sightly appearance. The wringer rolls are driven by power applied to the shaft 81, in the particular instance shown by the crank 94, and at the same time the drum 10 is driven by the belt 84 connecting the pulley 83 to the hand rail pulley on the drum. The size of the pulley 83 with relation to the wringer rolls is such as to cause a surface movement of the drum 10 at a slower speed than the rate of travel of the cloth, so that this drum 10, which is steam heated, and is in practice provided with a polished surface, irons the cloth passing over it and at the same time thoroughly dries this cloth. The degree of pressure of the cloth against the drum 10 is readily determined by the operator manipulating the drum upon which the cloth is finally wound. It is to be observed that the water of condensation in the drums 10 and 123 is taken care of automatically.

Figures 16, 17, 18, 19:
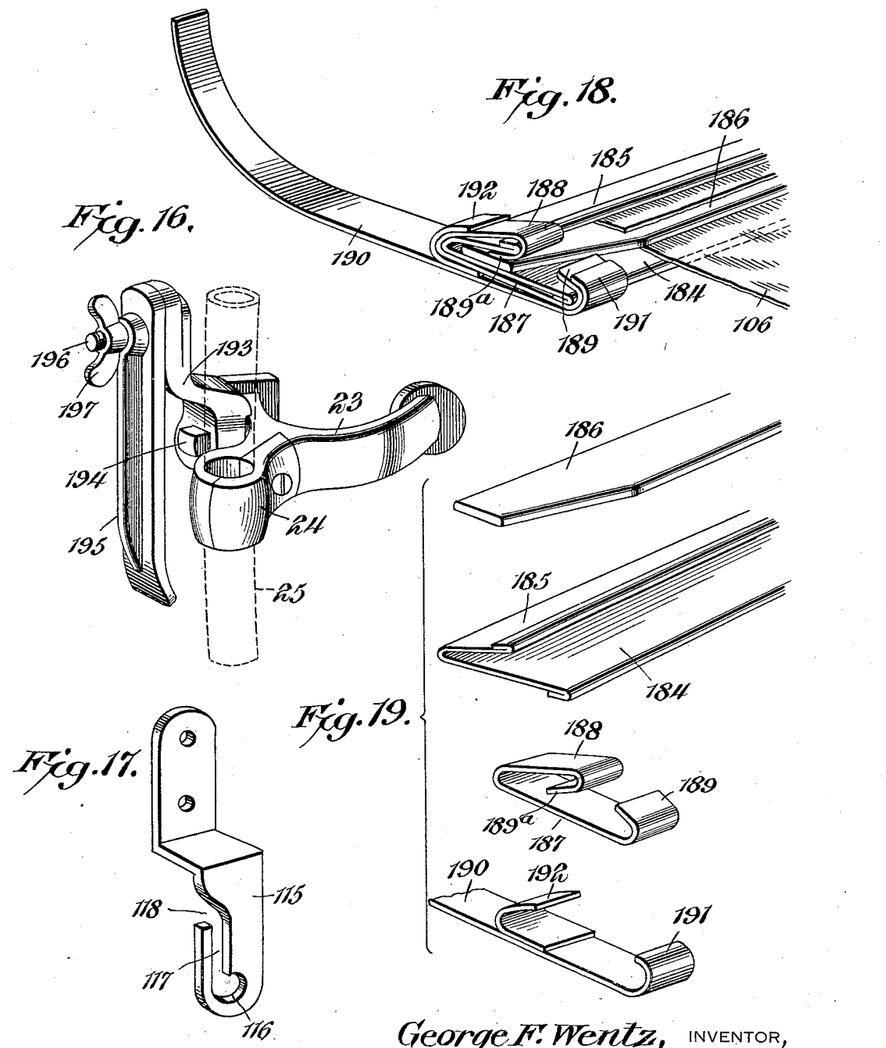
Fig. 16 is a perspective view of one of the hand rail brackets and an auxiliary supporting bracket thereon.
Fig. 17 is a perspective view of a guide roll supporting bracket.
Fig. 18 is a perspective view of one end of the cloth threading or inserting means.
Fig. 19 is a perspective view of the structure of Fig. 18 with the parts separated.

It is not feasible to place the cloth in position while the machine is cold and to then heat up the machine and start the operation, so there is included in the present invention means whereby the cloth is readily threaded through the various parts of the machine without the necessity of the operator touching any hot parts whereby injury might result. Such threading device comprises a strip 184, the major portion of which is plane and has one edge 185 returned on itself for a short distance in spaced angular relation to the plane portion. There is also provided a bar 186 with rounded edges and of a length about the same as the strip 184, the latter being about as long as the distance between the hand rails 25 of the drum 10. The bar 186 is designed to receive the end of the cloth to be treated, such end being folded over the bar and the latter being introduced into the turn over portion of the strip 184. There is also provided for each end of the strip 184 a removable clip 187 having inturned ends 188, 189, respectively, this clip being of sufficient length to be introduced on the strip 184 from the end thereof with the turned over portions in embracing relation to the edges of the strip, the turned over portion 188 having a return member 189ª adapted to embrace the returned part 185 of the strip 184 and underride the latter sufficiently to bear on the bar 186 when in position on the strip 184, the clip 187 being elastic to bear with some force upon the bar 187 to thereby hold it in place. There are also provided elongated strips 190 each appropriately curved and comparatively narrow. Each strip 190 has one end 191 returned on itself and designed to embrace the end 189 of the clip 187 and in spaced relation to the end 191 there is on the strip 190 a clip member 192 adapted to embrace the turned over end 188 of the clip 187. In assembling these parts a clip 187 may be introduced on to each end of the strip 184 to clamp the corresponding ends of the bar 186 thereto with the end of the cloth folded over said bar and then a strip 190 may be slipped over each clip 187, and by properly proportioning the parts the turned over end 191 will tend to force the turned over portion 188 of the clip 187 into firm engagement with the bar 186.

The strips 190 may be made of spring metal and constitute threading fingers readily introducible into the vat 147 about the submerging roller 150 and the weight of the strip 184 with the bar 186 will cause the uprising of the free end of the fingers 190 when this strip and bar gravitate to the bottom of the vat, and these fingers may be readily grasped by the operator without the necessity of touching the hot water within the vat. The same threading operation is performed in the cold water side of the vat, except that the fingers are moved about the submerging roller there located in the reverse direction to the threading of these fingers about the first submerging roller. The wringer roller 183 is readily removable and so does not interfere with the threading devices, and these are readily passed about the wringer drum 123 and between the same and the guiding roller 114 and may ultimately be drawn into close relation to the drum 10.

Certain or all of the brackets 23 at both ends of the drum have fast to one leg thereon a curved arm 193, by means of a bolt 194 or otherwise, and secured to the free end of this arm 193 is a finger 195 by a bolt 196 having a wing nut 197 thereon, the arm 193 and finger 195 being relatively curved to form between them a retaining bracket for the corresponding end of the strip 184 with the cloth attached thereto and carrying the threading fingers 190. Now, on rotating the drum 10 in the proper direction, the cloth is carried over the same smoothly and evenly and the threading devices may be removed from the cloth after the same is ready for attachment to the winding roller upon which it is ultimately received.

When the machine is used for steam shrinking, the web of cloth is directed around the rollers 144 and over the top of the chamber 143 to be there subjected to the action of steam escaping from said chamber through suitable perforations in the top thereof. By carrying the cloth after steam shrinking about the drum 10 it may be treated by this drum in the same manner as before described, and be ultimately wound upon the roller 109.

What is claimed is:—

1. In a machine for the purpose described, a drying drum having cylindrical peripheral walls and terminal heads separately formed therefrom, said heads being outwardly bowed from both the center and circumference and provided at both center and circumference with cylindrical flanges inset with relation to the corresponding end of the cylindrical body of the drum and the portions of the drum outside the respective heads being turned down against the outer faces of the head, each head being provided with a central collar conforming to the bowed shape of the head and each head being cemented to its collar and to the corresponding end of the cylindrical body, the drum being also provided with a supporting shaft extending through the respective collars and central cylindrical flanges.

2. In a machine for the purpose described, a drying drum having cylindrical walls and terminal heads, said heads being outwardly bowed from both center and circumference and provided at the circumference with a cylindrical flange inset with relation to the corresponding end of the cylindrical body of the drum, and the portions of the drum body outside the respective heads being turned down against the outer faces of the heads, and a central collar for each head conforming to the bowed shape of the head, each head being cemented to its collar and to the corresponding end of the cylindrical body.

3. In a machine for the purpose described, a rotatable drying drum, means for introducing steam thereinto, a drain valve for the drum movable to open and closed positions in succession, and separate spaced means in the path of the drain valve, one means causing the positive opening of the valve and the other means the positive closing thereof, said valve remaining in the position to which it is moved by one of said means while traveling with the drum into engagement with the other of said means.

4. In a machine for the purpose described, a rotatable drying drum, a drain valve adjacent the periphery of the drum and communicating with the interior thereof, means for causing the opening of the valve and the subsequent closing thereof while the valve is in its lowermost position with relation to the axis of rotation of the drum, means for conveying fluid from the valve to a position adjacent the axis of rotation of the drum, and means for receiving and conveying away fluid so directed.

5. In a machine for the purpose described, a rotatable drying drum, a shaft carrying the same, co-acting chambered members carried by said shaft, one of said members being rotatable and the other being held against rotation and said members intercommunicating, means connected to the non-rotatable member for conveying fluid therefrom, means connected to the rotatable member for conveying fluid thereto, a valve connected to the last named means and located near the periphery of the drum, and means in the path of the valve for moving the latter to the open position and then to the closed position while the valve is in the lowermost position with relation to the axis of rotation of the drum.

6. In a machine for the purpose described, a rotatable drying drum, a hollow shaft therefor opening into the interior of the drum, means for directing steam into said shaft, a drain valve carried by the drum near the periphery thereof and movable successively to the open and closed positions, means in the path of the valve while in its lowermost position for causing the opening of the valve and subsequent closing thereof, a fluid receptacle carried by the shaft exterior to the drum, said receptacle comprising two members one of which is movable with the shaft and the other stationary with relation thereto, said members having interior intercommunication, means for conveying fluid from the valve to the movable member of said receptacle, and means for conveying fluid away from the stationary portion of the said receptacle.

7. In a machine for the purpose described, a rotatable drying drum, means for introducing steam thereinto, a drain valve for the drum movable to open and closed positions in succession and in the same sense, and separate spaced means in the path of the drain valve in position to engage the valve on the same side to positively open the valve and to positively close the same without changing the direction of rotation of the valve, the latter remaining in the position to which it is moved by one of said means while traveling with the drum into engagement with the other of said means.

8. In a machine for the purpose described, a rotatable drying drum, and a drain valve therefor movable progressively and successively to the open and closed positions, said valve having a rotatable member, a star wheel thereon, and fixed members in the path of the arms of the star wheel, said fixed members being spaced apart to engage the arms of the star wheel in succession.

9. In a machine for the purpose described, a rotatable drying drum, a shaft therefor, a drain valve carried by the drum near the periphery thereof, and means for conveying fluid from the drain valve to a suitable point of disposal comprising a sleeve mounted on the shaft and having an open ended chamber formed therein and also provided with an overhang flange near the open end of the chamber, connections between the valve and the chamber within the sleeve, another sleeve mounted on the first named sleeve and provided with a forwardly directed flange seated on the first named sleeve and extending into the space between the overhang flange and the outer wall of the first named sleeve, means for conducting fluid from the interior of the second named sleeve to a point of disposal, the said second named sleeve being in communication with the chamber of the first named sleeve, and a packing gland carried by the first named sleeve in operative relation to the second named sleeve.

10. In a machine for the purpose described, a rotatable drying drum, a hollow shaft supporting the same and leading thereinto, a swivel connection with one end of the shaft, a steam pipe leading to the swivel connection, and an air valve interposed in the steam pipe connection, said air valve closing the steam pipe when the said valve is in the open position.

11. In a machine for the purpose described, a rotatable drying drum, a hollow shaft supporting the same and leading thereinto, a swivel connection with one end of the shaft, a steam pipe leading to the swivel connection, and an air valve interposed in the steampipe connection, said air valve closing the steam pipe when the said valve is in the open position, said air valve comprising two separated valve members one for the steam pipe and the other for the air inlet.

12. In a machine for the purpose described, a rotatable drying drum, a hollow shaft for the drum leading thereinto, steam pipe connections to the interior of the shaft, said connections including a chambered member with two connected alined chambers of different sizes, with the smaller chamber provided with a side connection with the other chamber, and said second chamber having an opening leading to the atmosphere, and a valve comprising two spaced members of different sizes, one member being lodged in the chamber connected to the steam pipe and the other in the chamber with which the steam pipe chamber is connected, the first named valve member controlling the steam pipe exit and the second named valve member controlling the air passage to the interior of the chamber in which the valve is lodged.

13. In a machine for the purpose described, a drying drum provided with a cylindrical body with meeting edges in abutting relation, a junction strip within the drum underriding the meeting edges of the cylindrical body, the material of the cylindrical body being inset into the junction strip, rivets traversing the junction strip and headed into the inset portions of the cylindrical member, and cementing material sealing the junction points of the strip and cylindrical body, and a counterbalancing strip within the drum in diametric relation to the first named strip.

14. In a machine for the purpose described, a drying drum having heads outwardly bowed from the center and the circumference, means for introducing steam into the drum, and a steam controlled air valve leading to the interior of the drum, said valve of greater area than the surface subjected to the action of steam.

15. In a machine for the purpose described, a rotatable drying drum, means for the introduction of steam thereinto, an air inlet valve for the drum of an area on the air engaged side greater than the area of the steam engaged side, a drain valve for the drum, and means responsive to the rotative movement of the drum when the valve is in the lowermost position to open and subsequently close the valve to the escape of fluid within the drum.

16. In a machine for the purpose described, a rotatable drying drum, a drive shaft, means for the transmission of power through the drive shaft to the drum to rotate the latter, said drive shaft having one end socketed, a journal bracket in spaced coactive relation to the socketed end of the drive shaft and provided with means for the ready application and removal of a journal, and a guide roller provided at one end with a member adapted to the socketed end of the drive shaft and at the other end with a journal adapted to the journal bracket.

17. In a machine for the purpose described, a rotatable drying drum, a drive shaft, means for the transmission of power through the drive shaft to the drum to rotate the latter, said drive shaft having one end socketed, a journal bracket in spaced coactive relation to the socketed end of the drive shaft and provided with means for the ready application and removal of a journal, and a guide roller provided at one end with a member adapted to the socketed end of the drive shaft and at the other end with a journal adapted to the journal bracket, and said journal bracket being provided with an indirect open ended passage leading to the journal seat of the bracket for the insertion into and removal of the journal from the bracket.

18. In a machine for the purpose described, a rotatable drying drum, a drive shaft provided with axially disposed means for the reception and removal of a spindle, a guide roller on said spindle, connections between the drive shaft and the drying drum for imparting motion to the latter, a gear wheel on the drive shaft, another gear wheel in mesh therewith, a shaft on which the second named gear wheel is secured, said last named shaft being provided with an axial socket member for the reception and removal of a spindle, and a wringer roll secured to the last named spindle.

19. In a machine for the purpose described, a rotatable drying drum, a rotatable wringer roll adjacent to and out of engagement with the drum, a drive shaft, connections between the drive shaft and drying drum for imparting motion to the latter, and connections between the drive shaft and wringer roll for causing movement of the wringer roll simultaneously with movement of the drying drum.

20. In a machine for the purpose described, a rotatable drying drum provided with a pulley at one end, a drive shaft having means for the application of power at one end and a pulley at the other end, belt connections between the pulley on the drive shaft and the pulley on the drum, a wringer roll out of engagement with the drying drum, and gearing for imparting motion from the drive shaft to the wringer roll.

21. In a machine for the purpose described, a drying drum having a hand rail at one end with its periphery shaped to constitute a pulley, a drive shaft at one side of the drying drum having means at one end for the application of power, and at the other end carrying a pulley, and a belt connection between the pulleys of the drive shaft and drying drum.

22. In a machine for the purpose described, a drying drum, a drive shaft therefor at one side thereof, driving connections between the drive shaft and the drum, a hollow wringer roller, driving connections between the drive shaft and the wringer roll and including a socket member carried by the driving connection and a mating member carried by the wringer roll, and means for introducing steam into the wringer roll.

23. In a machine for the purpose described, a hollow wringer roll provided at one end with a hollow shaft, a fixed tube extending through the hollow shaft and having at the inner end an angle extension opening close to the bottom of the interior of the wringer roll, a steam conveying pipe extending through the fixed tube and leading into the interior of the wringer roll, and conduits leading respectively to the steam pipe and to the fixed pipe for conveying steam to the steam pipe and conveying away water of condensation from the fixed pipe.

24. In a machine for the purpose described, a hollow wringer roll provided at one end with a hollow shaft, a fixed tube extending through the hollow shaft and having at the inner end an angle extension opening close to the bottom of the interior of the wringer roll, a steam conveying pipe extending through the fixed tube and leading into the interior of the wringer roll, and conduits leading respectively to the steam pipe and to the fixed pipe for conveying steam to the steam pipe and conveying away water of condensation from the fixed pipe, the wringer roll having one end formed with a lubricant receptacle, which latter opens at one end through the hollow shaft into operative relation to the fixed pipe and provided at the other end with means for retaining the lubricant.

25. In a machine for the purpose described, a wringer roll structure comprising a cylindrical drum having a head provided with an elongated hollow hub constituting a supporting shaft, a fixed tube extending through the hollow hub, packing means carried by the outer end of the hollow hub in operative relation to the fixed tube, a cap nut carried by the inner end of the fixed tube within the wringer drum and provided with a radial neck, another cap nut applied to the outer end of the fixed tube and having axial and radial necks, a pipe traversing both cap nuts and the fixed tube in the longitudinal axis thereof and opening into the interior of the drum, and pipes, one connected to the central tube and the other to the fixed pipe for conveying steam to the central tube and water of condensation from the fixed pipe respectively.

26. In a machine for the purpose described, a vat having a partition dividing it into two compartments, a steam coil lodged in one compartment, a water duct entering the other compartment, and submerging rolls one at the entrance end and the other at the exit end of the respective compartments, the dividing partition constituting an elevating support for fabric passing over it and under the submerging rolls.

27. In a machine for the purpose described, a vat having a partition dividing it into two compartments, a steam coil lodged in one compartment, a water duct in the other compartment, and an adjustable overflow in each compartment comprising a stopper member with a tubular stem with one end threaded, and a threaded sleeve entering the threaded end of the stem.

28. In a machine for the purpose described, a drying drum, brackets at the ends thereof, hook members fast to said brackets at opposite ends of the drum, and a cloth manipulator having clamping members for holding the cloth and adapted to the hook members at the ends of the drum.

29. In a machine for the purpose described, a drying drum, a shrinking vat having submerging rollers at the ends, a wringer roll between the vat and drying drum, hook members at opposite ends of the drying drum, and a cloth manipulator having clamp members adapted to hold the end of the cloth, and threading fingers for directing the clamp members around the submerging rolls and wringer roll and adapted to be hung at the ends on the hooks carried by the drying drum.

In testimony, that I claim the foregoing as my own, I have hereto affixed my signature in the presence of two witnesses.

GEORGE FRANKLIN WENTZ.

Witnesses:
L. I. LITZLER,
JNO. CHAPEK.

---

Copies of this patent may be obtained for five cents each, by addressing the "Commissioner of Patents, Washington, D. C."